(12) United States Patent
Lee

(10) Patent No.: US 11,775,190 B2
(45) Date of Patent: Oct. 3, 2023

(54) MEMORY SYSTEM AND OPERATING METHOD OF MEMORY SYSTEM

(71) Applicant: SK hynix Inc., Gyeonggi-do (KR)

(72) Inventor: Geu Rim Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/592,842

(22) Filed: Feb. 4, 2022

(65) Prior Publication Data

US 2023/0074259 A1 Mar. 9, 2023

(30) Foreign Application Priority Data

Sep. 8, 2021 (KR) .......................... 10-2021-0119493

(51) Int. Cl.
G06F 3/06 (2006.01)

(52) U.S. Cl.
CPC ............ *G06F 3/064* (2013.01); *G06F 3/0619* (2013.01); *G06F 3/0647* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 2012/0023365 A1* | 1/2012 | Byom ................. G06F 11/2094 711/E12.001 |
| 2016/0180959 A1* | 6/2016 | Darragh ................. G11C 16/12 365/185.09 |
| 2020/0333976 A1* | 10/2020 | Cariello ............. G06F 11/3034 |
| 2021/0018975 A1* | 1/2021 | Liang .................... G06F 3/0679 |

FOREIGN PATENT DOCUMENTS

| KR | 10-1001446 B1 | 12/2010 |
| KR | 10-2017-0005915 A | 1/2017 |
| KR | 10-2020-0067962 A | 6/2020 |

\* cited by examiner

*Primary Examiner* — Michael Alsip
(74) *Attorney, Agent, or Firm* — IP & T GROUP LLP

(57) ABSTRACT

Embodiments of the present disclosure relate to a memory system and an operating method of the memory system. According to embodiments of the present disclosure, the memory system may include a memory device having a plurality of memory blocks configured to store data; and a memory controller configured to: store the data in a first memory block group including N memory blocks among the plurality of memory blocks, set the data stored in the first memory block group to a read-only state, and migrate, after a threshold time has elapsed from a reference time, a target data which is all or part of the data stored in the first memory block group, to a second memory block group including M memory blocks among the plurality of memory blocks.

17 Claims, 14 Drawing Sheets

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0119493 filed on Sep. 8, 2021, which is incorporated herein by reference in its entirety.

TECHNICAL FIELD

The embodiments of the present disclosure relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

Moreover, the lifespan of a memory system may be determined by erase/program cycles for a plurality of memory blocks included in a memory device. If a memory system continuously updates data in a memory device, the erase/program cycle values of the plurality of memory blocks increase. A memory block with a large erase/program cycle value becomes a bad memory block and is more likely to be no longer used to store data. Accordingly, a storage capacity of the memory system may be reduced and the lifespan of the memory system may be shortened.

SUMMARY

Embodiments of the present disclosure may provide a memory system and an operating method of the memory system capable of minimizing damage to stored data and efficiently managing stored data.

In one aspect, embodiments of the present disclosure may provide a memory system including a memory device having a plurality of memory blocks configured to store data; and a memory controller configured to: store data in a first memory block group including N memory blocks among the plurality of memory blocks, where N is a natural number equal to or greater than 2, set the data stored in the first memory block group to a read-only state, and migrate, after a threshold time has elapsed from a reference time, a target data which is all or part of the data stored in the first memory block group, to a second memory block group including M memory blocks among the plurality of memory blocks, where M is a natural number equal to or greater than 2.

In another aspect, embodiments of the present disclosure may provide an operating method of a memory system including, storing data in a first memory block group including N memory blocks among a plurality of memory blocks, where N is a natural number equal to or greater than 2; setting the data stored in the first memory block group to a read-only state; and migrating, after a threshold time has elapsed from a reference time, a target data which is all or part of the data stored in the first memory block group, to a second memory block group including M memory blocks among the plurality of memory blocks, where M is a natural number equal to or greater than 2.

According to embodiments of the present disclosure, it is possible to minimize the damage of stored data and efficiently manage the stored data.

DETAILED DESCRIPTION

Figure 1:
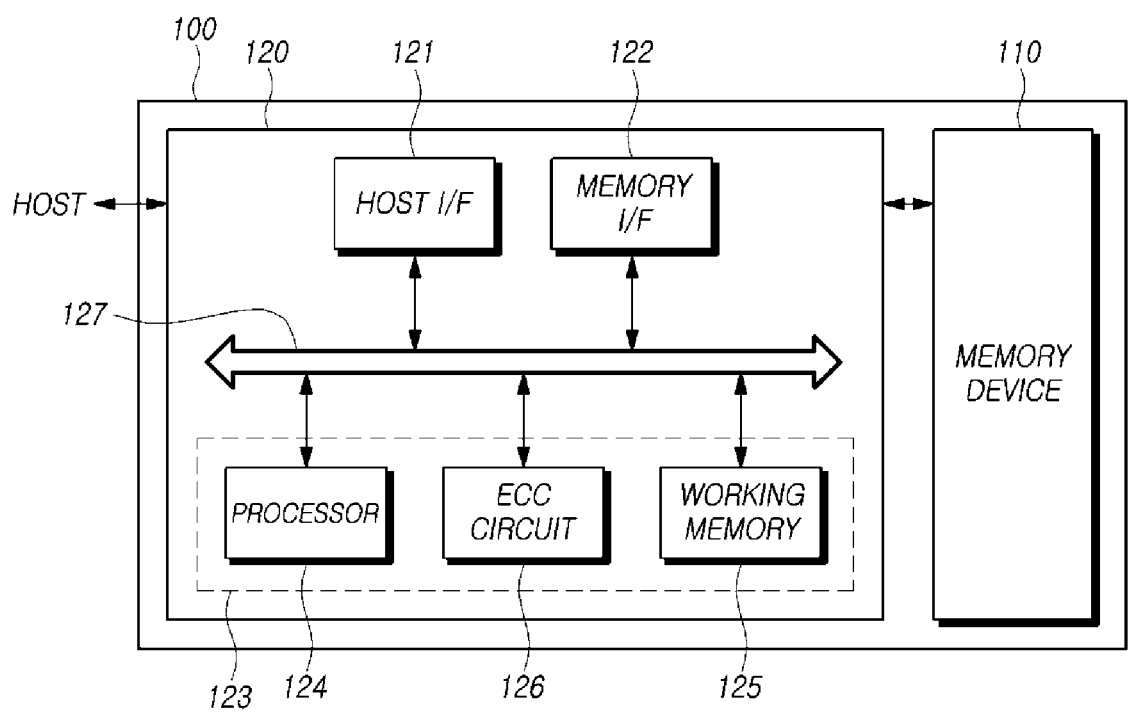
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented, at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written to, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
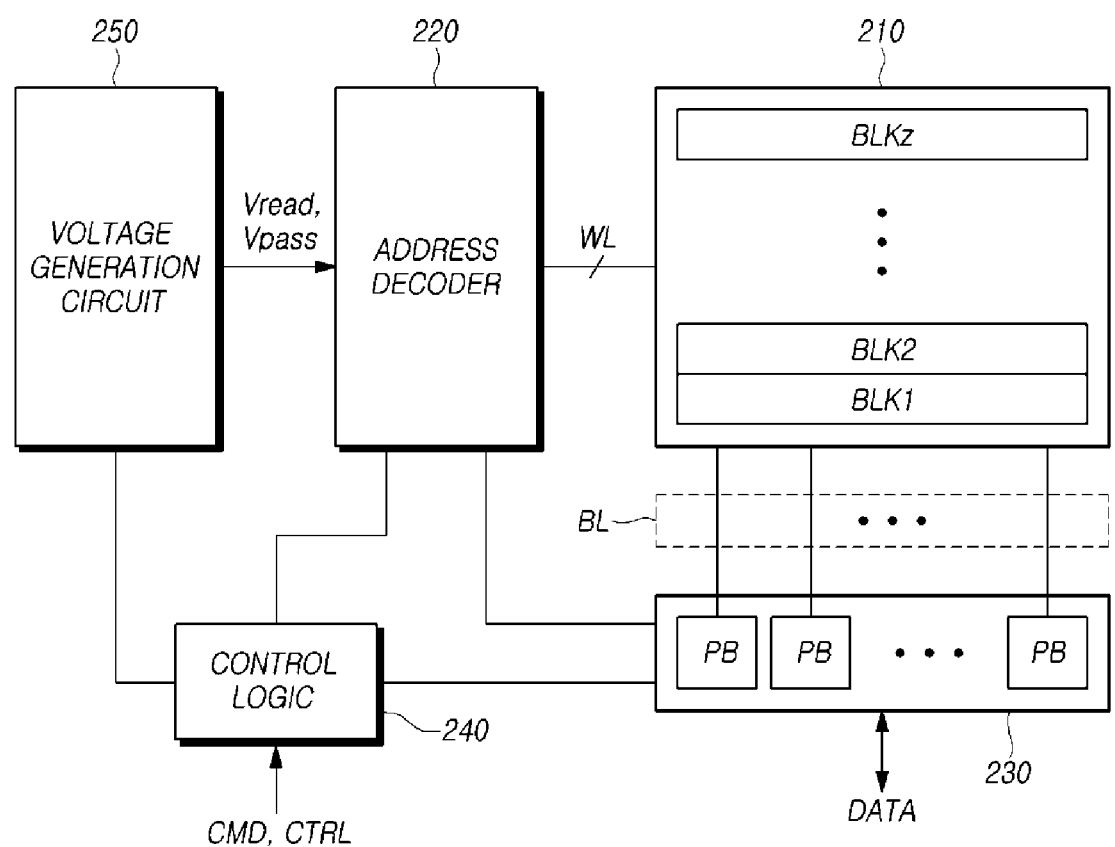
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
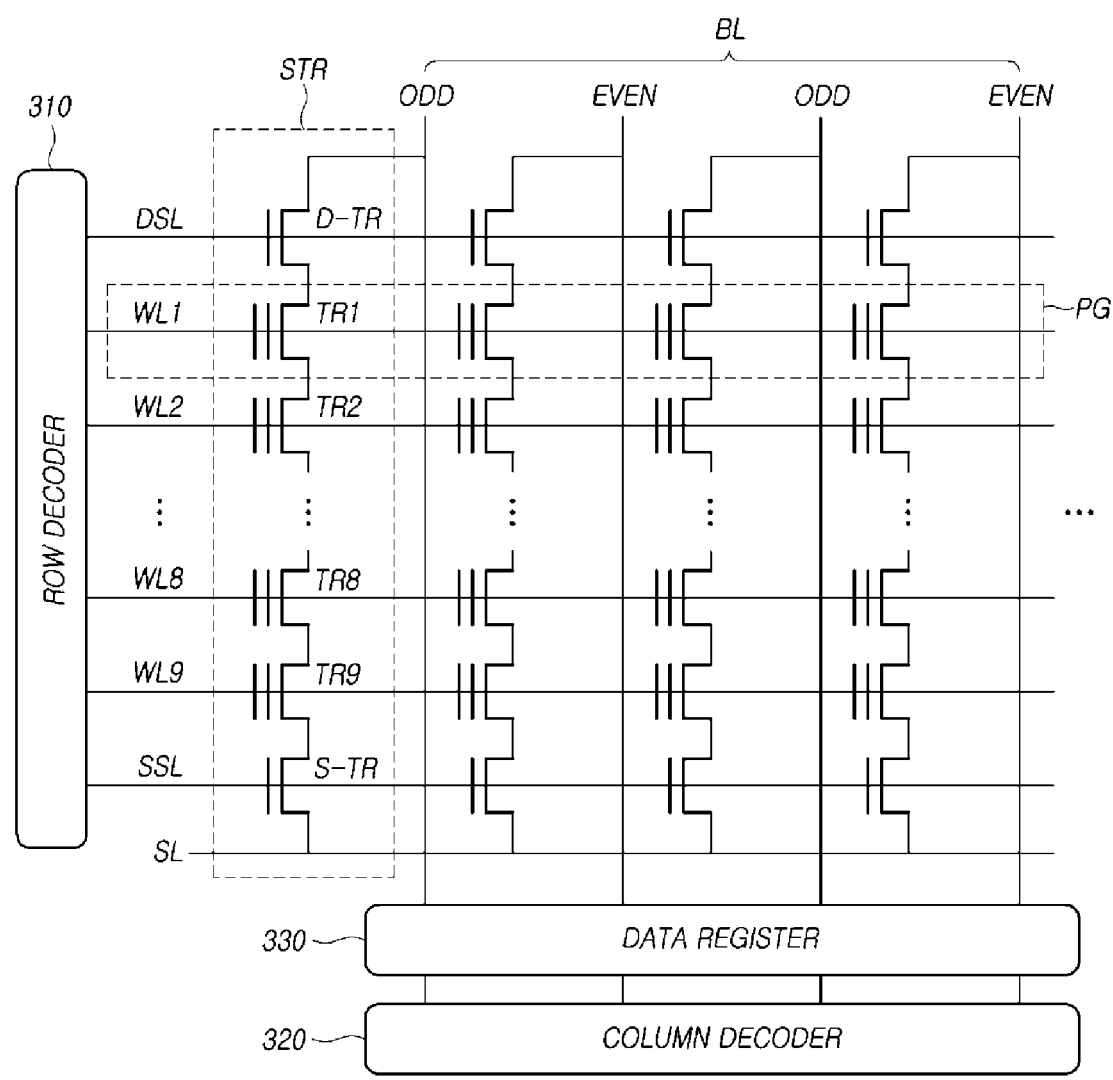
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) which includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
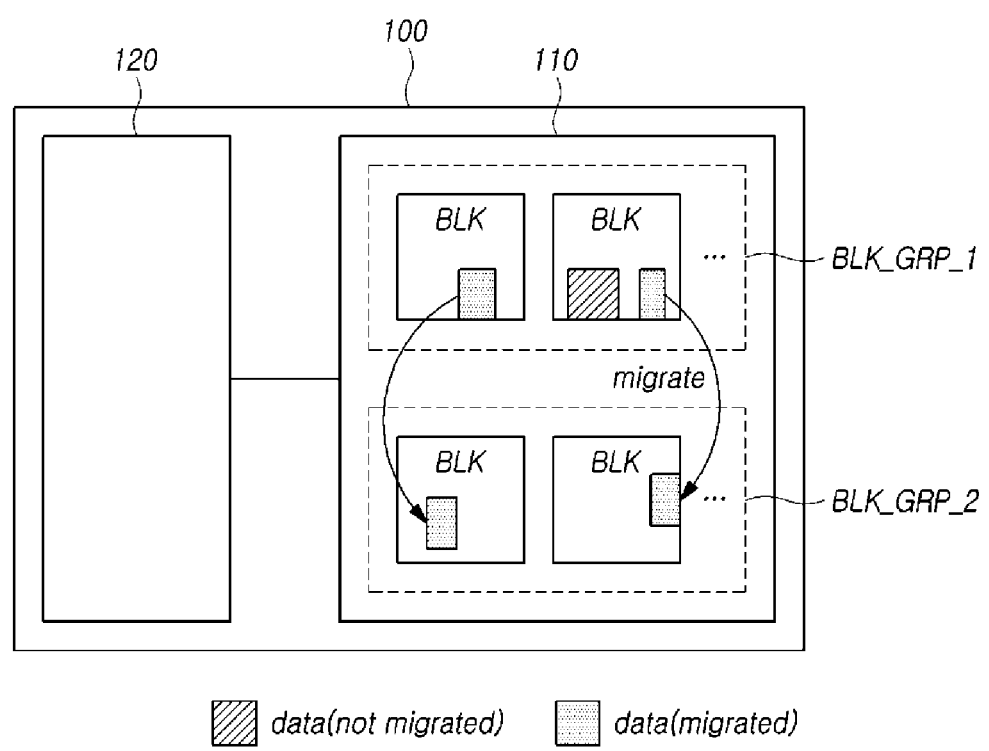
FIG. 4 illustrates a schematic structure of a memory system according to embodiments of the present disclosure.

FIG. 4 illustrates a schematic structure of a memory system 100 according to embodiments of the present disclosure.

Referring to FIG. 4, a memory system 100 may include a memory device 110 and a memory controller 120.

The memory device 110 may include a plurality of memory blocks BLK. Data may be stored in the plurality of memory blocks BLK. For example, the data stored in the plurality of memory blocks BLK may be data write-requested by the above-described host HOST.

The memory controller 120 may control the memory device 110 to store data in the memory device 110.

Specifically, the memory controller 120 may store data in a first memory block group BLK_GRP_1. The first memory block group BLK_GRP_1 may include N memory blocks, where N is a natural number equal to or greater than 2, among a plurality of memory blocks BLK included in the memory device 110. Storing data in the first memory block group BLK_GRP_1 means storing data in memory blocks included in the first memory block group BLK_GRP_1.

The memory controller 120 may set data stored in the first memory block group BLK_GRP_1 to a read-only state. The data set to the read-only state is not updated and may be maintained as in the read-only state until the memory system 100 is initialized. That is, the memory controller 120 may store new data in the first memory block group BLK_GRP_1 but does not update the data set to the read-only state, i.e., previously stored in the first memory block group BLK_GRP_1.

The memory controller 120 may migrate all or part of target data stored in the first memory block group BLK_GRP_1 to a second memory block group BLK_GRP_2. The second memory block group BLK_GRP_2 may include M memory blocks, where M is a natural number equal to or greater than 2, among the plurality of memory blocks BLK included in the memory device 110.

Migrating the target data to the second memory block group BLK_GRP_2 means storing the target data in memory blocks included in the second memory block group BLK_GRP_2.

Moreover, a memory block storing target data among the memory blocks included in the first memory block group BLK_GRP_1 may be, after migration of the target data from the first memory block group BLK_GRP_1 to the second memory block group BLK_GRP_2 is is completed, included in the first memory block group BLK_GRP_1 as it is or may be included in the second memory block group BLK_GRP_2.

The memory controller 120 may execute an operation of migrating all or part of data stored in the first memory block group BLK_GRP_1 to the second memory block group BLK_GRP_2 every specific period. In this case, a separate power supply (not shown) may be additionally included in the memory system 100 in order to independently supply power used for the memory controller 120 to periodically migrate all or part of data stored in the first memory block group BLK_GRP_1 to the second memory block group BLK_GRP_2. For example, the power supply may be a battery or a capacitor.

The first memory block group BLK_GRP_1 and the second memory block group BLK_GRP_2 may be preset areas which do not to overlap each other. The memory controller 120 may set the first memory block group BLK_GRP_1 and the second memory block group BLK_GRP_2 in advance before storing data in the memory device 110.

Figure 5:
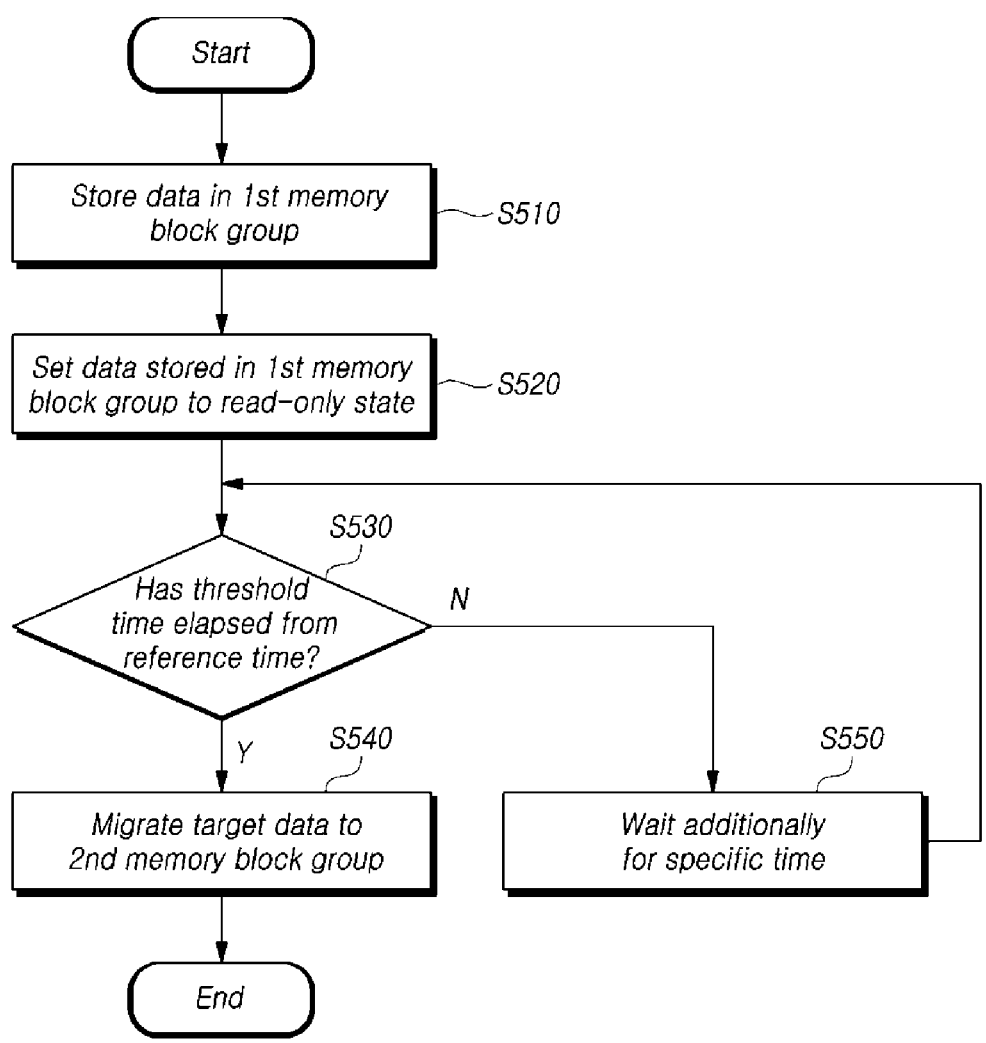
FIG. 5 is a flowchart illustrating an example of operating method of a memory system according to embodiments of the present disclosure.

FIG. 5 is a flowchart illustrating an example of operating method of a memory system 100 according to embodiments of the present disclosure.

Referring to FIG. 5, the memory controller 120 of the memory system 100 may first store data in the first memory block group BLK_GRP_1 (S510).

The memory controller 120 may set the data stored in the first memory block group BLK_GRP_1 to a read-only state (S520).

Then, the memory controller 120 may determine whether a threshold time has elapsed from a preset reference time (S530).

In this case, the value of the threshold time THR_CLOSED may be a preset value, a value set by the host HOST, or a value set based on a specification of the memory system 100.

If the threshold time elapses from the reference time (S530-Y), the memory controller 120 may migrate target data, which is all or part of the data stored in the first memory block group BLK_GRP_1, to the second memory block group BLK_GRP_2 (S540).

On the other hand, if the threshold time has not yet elapsed from the reference time (S530-N), the memory controller 120 may additionally wait for a specific time until the threshold time elapses (S550). Thereafter, the memory controller 120 may again determine whether the threshold time has elapsed from the reference time in operation S530.

Hereinafter, an example in which the memory system 100 sets a reference time as a reference for determining whether the threshold time has elapsed, will be described.

Figure 6:
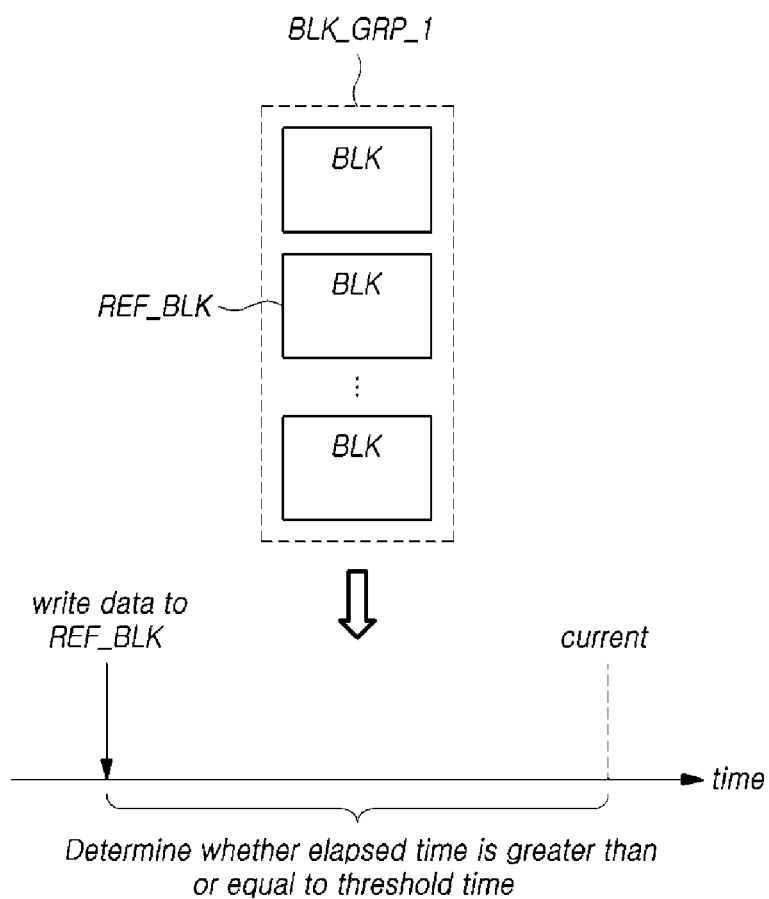
FIG. 6 illustrates an example of an operation in which a memory system sets a reference time according to embodiments of the present disclosure.

FIG. 6 illustrates an example of an operation in which a memory system 100 sets a reference time according to embodiments of the present disclosure.

Referring to FIG. 6, the memory controller 120 of the memory system 100 may set the reference time as a time point when all or part of data written to the first memory block group BLK_GRP_1 is written to a reference memory block REF_BLK. In this case, the reference memory block REF_BLK is one of the plurality of memory blocks BLK included in the first memory block group BLK_GRP_1.

For example, a time point when data is written into the reference memory block REF_BLK may be defined as a time point when data is started to be written into the reference memory block REF_BLK.

As another example, a time point when data is written into the reference memory block REF_BLK may be defined as a time point when the reference memory block REF_BLK becomes a closed state. The closed state of a memory block BLK means that data is written to all pages to which data can be written in the corresponding memory block BLK, so that new data cannot be written any more.

That is, the memory controller 120 determines whether the elapsed time from the time point when data is written into the reference memory block REF_BLK to the present is equal to or greater than the threshold time, and may determine whether to migrate all or part of data stored in the first memory block group BLK_GRP_1 to the second memory block group BLK_GRP_2.

Hereinafter, an operation in which the memory system 100 determines the reference memory block REF_BLK from among the memory blocks included in the first memory block group BLK_GRP_1, will be described.

Figure 7:
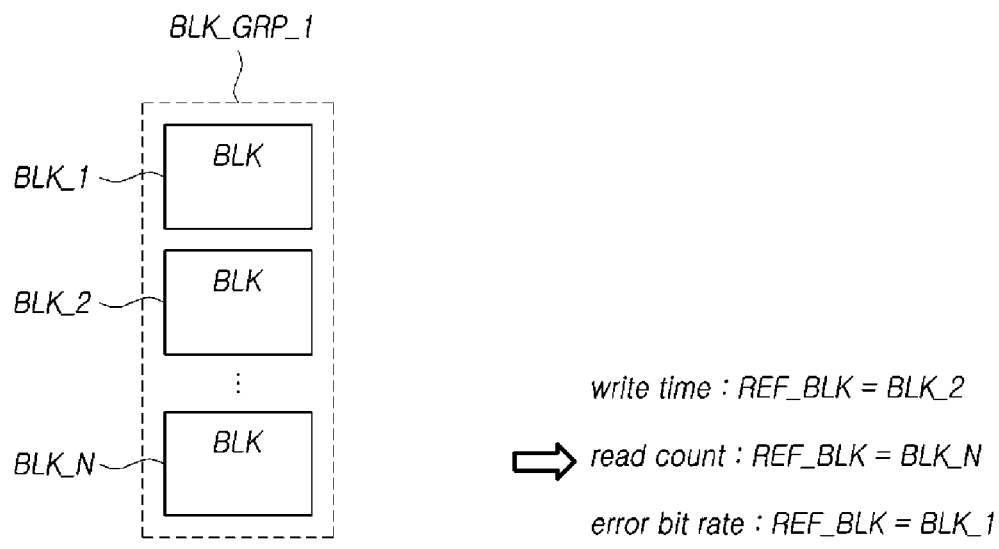
FIG. 7 illustrates an example of an operation in which a memory system determines a reference memory block according to embodiments of the present disclosure.

FIG. 7 illustrates an example of an operation in which a memory system 100 determines a reference memory block REF_BLK according to embodiments of the present disclosure.

Referring to FIG. 7, the memory controller 120 of the memory system 100 may determine the reference memory block REF_BLK, from among the plurality of memory blocks BLK_1, BLK_2, . . . , BLK_N included in the first memory block group BLK_GRP_1, as (1) a memory block in which all or part of data written to the first memory block group BLK_GRP_1 is written first, (2) a memory block with the largest read count, or (3) a memory block with the largest error bit rate.

As an example, (1) the memory controller 120 may determine a memory block in which all or part of data written to the first memory block group BLK_GRP_1 is written first as the reference memory block REF_BLK. In the case that the time point when all or part of the data written to the first memory block group BLK_GRP_1 is written is WT2< . . . <WT1<WTN, the second memory block BLK_2 may be determined as the reference memory block REF_BLK.

As another example, (2) the memory controller 120 may determine a memory block having the largest read count as the reference memory block REF_BLK. In the case that the read count value is RC1<RC2< . . . <RCN, N-th memory block BLK_N may be determined as the reference memory block REF_BLK.

As another example, (3) the memory controller 120 may determine a memory block having the largest error bit rate as the reference memory block REF_BLK. In the case that the error bit rate is EBRN<EBR2< . . . <EBR1, the first memory block BLK_1 may be determined as the reference memory block REF_BLK.

Hereinafter, detailed embodiments of the operation of the above-described memory system 100 will be described. First, an order in which the memory system 100 stores data in the first memory block group BLK_GRP_1 will be described. In this case, the order of storing data in the first memory block BLK_GRP_1 indicates from which part of the first memory block BLK_GRP_1 data is stored.

Figure 8:
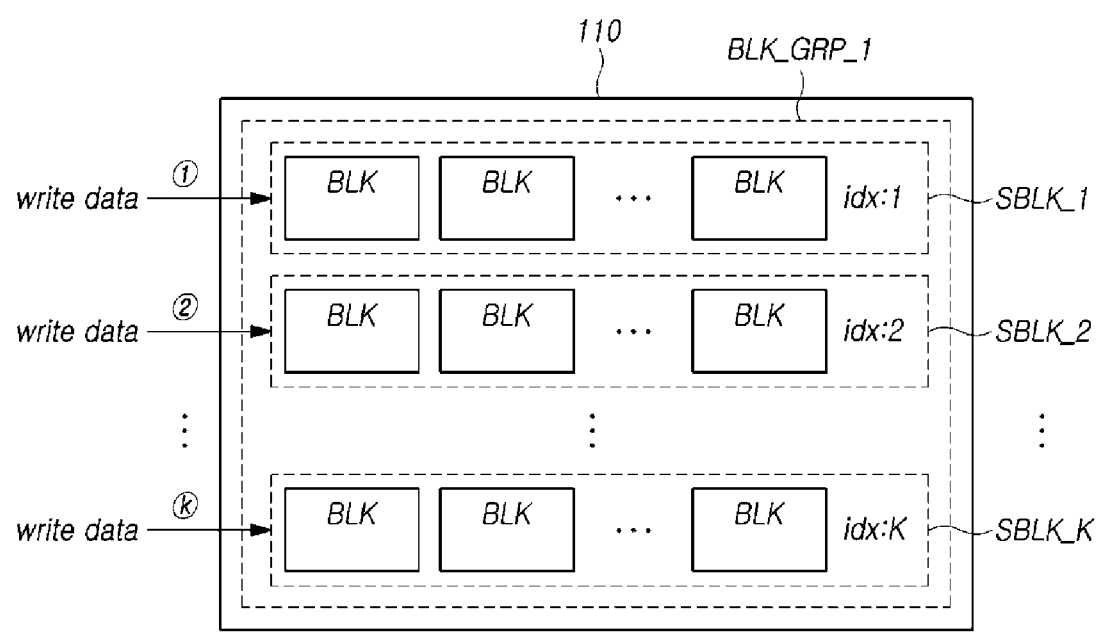
FIG. 8 illustrates an example of an order of storing data in a first memory block group by a memory system according to embodiments of the present disclosure.

FIG. 8 illustrates an example of an order of storing data in a first memory block group BLK_GRP_1 by a memory system 100 according to embodiments of the present disclosure.

Referring to FIG. 8, the memory controller 120 of the memory system 100 may determine the order of storing data in the first memory block group BLK_GRP_1 based on the indexes of K super memories SBLK_1, SBLK_2, . . . , SBLK_K included in the first memory block group BLK_GRP_1, where K is a natural number.

The super memory block is a unit of logical storage space including one or more memory blocks. Each of the super memory blocks SBLK_1, SBLK_2, . . . , SBLK_K may include one or more of the memory blocks BLK included in the first memory block group BLK_GRP_1. Storing data in the super memory block means that data is stored in a memory block included in the corresponding super memory block.

In this case, the indexes of the super memory blocks SBLK_1, SBLK_2, ~, and SBLK_K may be values already determined in an initialization step of the memory system 100.

In FIG. 8, the indexes of the super memory blocks SBLK_1, SBLK_2, . . . , SBLK_K are 1, 2, . . . , and K, respectively. However, the value of the index of each of the super memory blocks SBLK_1, SBLK_2, . . . , SBLK_K are not limited to the embodiment described with reference to FIG. 8, and may be set in various ways.

As an example, the memory controller 120 may determine an order of storing data in the first memory block group BLK_GRP_1 in an ascending order of indexes of the super memory blocks SBLK_1, SBLK_2, . . . , SBLK_K. That is, the memory controller 120 may first write data to the first super memory block SBLK_1 having the smallest index value (①), and then write data to the second super memory block SBLK_2 having the next smallest index value. can be written (②). In this way, the memory controller 120 may write data to the K-th super memory block SBLK_K having the largest K-th index value according to this order (Ⓚ).

Further, in FIG. 8, it has been described the case in which the memory controller 120 determines the order of storing data in the first memory block group BLK_GRP_1 according to the ascending order of the indexes of the super memory blocks SBLK_1, SBLK_2, . . . , SBLK_K. However, the memory controller 120 may determine the order of storing data in the first memory block group BLK_GRP_1 by using another method. As an example, the memory controller 120 may determine the order of storing data in the first memory block group BLK_GRP_1 according to a descending order of the indexes of the super memory blocks SBLK_1, SBLK_2, . . . , SBLK_K.

Furthermore, the memory controller 120 may store the order of storing data in the first memory block group BLK_GRP_1 as a separate data structure (e.g., table, list).

In the above, it has been described the order in which the memory system 100 stores data in the first memory block group BLK_GRP_1.

Hereinafter, it will be described an operation in which the memory system 100 migrates data stored in the first memory block group BLK_GRP_1 to the second memory block group BLK_GRP_2.

Figure 9:
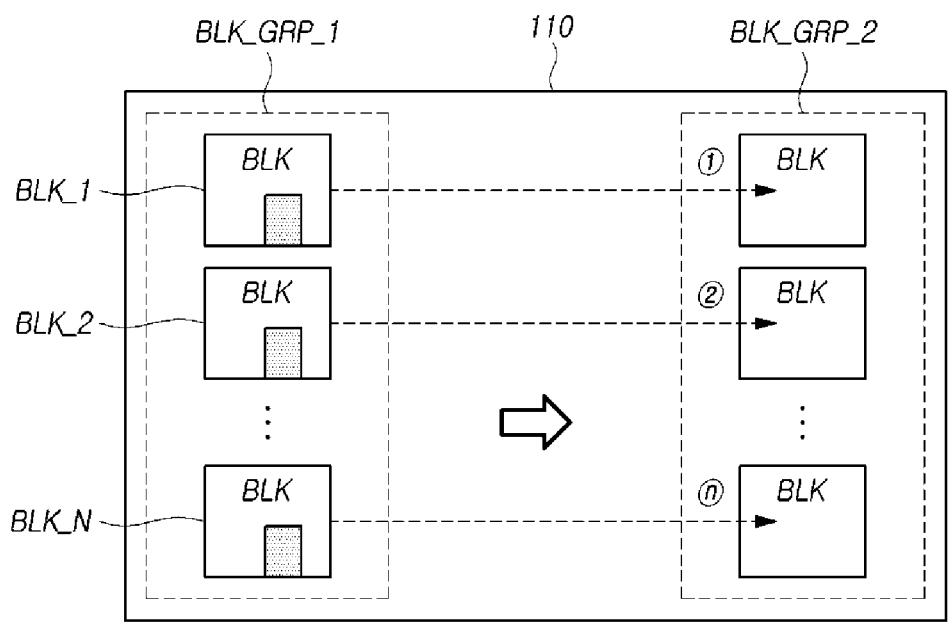
FIG. 9 illustrates an example of an order of migrating data stored in a first memory block group to a second memory block group by a memory system according to embodiments of the present disclosure.

FIG. 9 illustrates an example of an order of migrating data stored in a first memory block group BLK_GRP_1 to a second memory block group BLK_GRP_2 by a memory system 100 according to embodiments of the present disclosure.

Referring to FIG. 9, the memory controller 120 of the memory system 100 may determine an order of migrating the target data stored in the first memory block group BLK_GRP_1 to the second memory block group BLK_GRP_2 according to an order of error bit rate for each of the memory blocks BLK_1, BLK_2, . . . , BLK_N included in the first memory block group BLK_GRP_1.

The error bit rate for the memory block may be determined by the number of bits of data in which an error occurs compared to the number of bits of data stored in the corresponding memory block. For example, if an error occurs in 3 bits of data among all 1000 bits of data, the error bit rate may be determined as 3/1000=0.3%.

After reading the data stored in the corresponding memory block, the memory controller 120 may execute error detection logic (e.g., parity, CRC, Hamming code) on the read data to detect the number of bits of data in which an error occurs.

The memory controller 120 may manage the determined error bit rate for each of the memory blocks BLK_1, BLK_2, . . . , BLK_N by using a separate data structure (e.g., table, list).

For example, in FIG. 9, the error bit rate for the first memory block BLK_1 is EBR1, the error bit rate for the second memory block BLK_2 is EBR2, and the error bit rate for the N-th memory block BLK_N is EBRN. In this case, EBR1 is greater than EBR2, and EBR2 is greater than EBRN.

As an example, the memory controller 120 may determine the order of migrating the data stored in the target memory blocks BLK_1, BLK_2, . . . , BLK_N to the second memory block group BLK_GRP_2 according to a descending order of error bit rates for each of the memory blocks BLK_1, BLK_2, . . . , BLK_N.

That is, the memory controller 120 may migrate the data stored in the first memory block BLK_1 having the largest error bit rate to the second memory block group BLK_GRP_2 (①), and then migrate data stored in the second memory block BLK_2 having the next largest error bit rate to the second memory block group BLK_GRP_2 (②). In this way, the memory controller 120 may migrate data stored in the n-th memory block BLK_N having the smallest error bit rate to the second memory block group BLK_GRP_2 at the N-th (ⓝ).

Hereinafter, a specific method of determining an error bit rate for a memory block, which is a criterion for determining an order of migrating data stored in the first memory block group BLK_GRP_1 to the second memory block group BLK_GRP_2, will be described.

Figure 10:
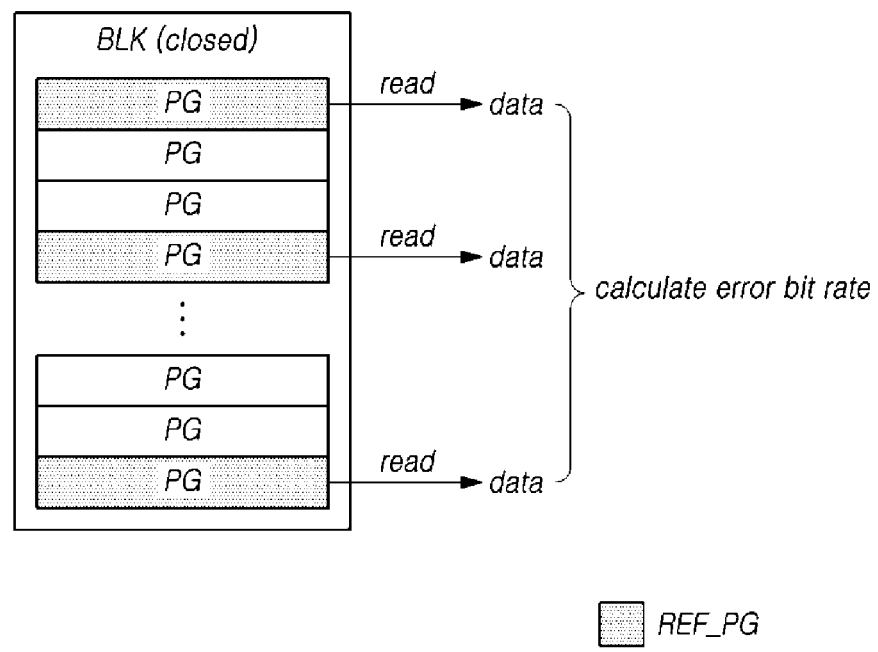
FIG. 10 illustrates an example of a method for determining an error bit rate for a memory block by a memory system according to embodiments of the present disclosure.

FIG. 10 illustrates an example of a method for determining an error bit rate for a memory block by a memory system 100 according to embodiments of the present disclosure.

Referring to FIG. 10, in order to calculate an error bit rate for a memory block BLK, the memory controller 120 of the memory system 100 may read data stored in one or more reference pages REF_PG among a plurality of pages PG included in the memory block BLK.

The reason why the memory controller 120 reads data stored in one or more reference pages REF_PG among the plurality of pages PG included in the memory block BLK is to calculate the error bit rate as quickly as possible.

In this case, the reference pages REF_PG may be, for example, a page having a specific index among a plurality of pages PG included in the memory block BLK. For example, a page having a largest index, a page having a smallest index, and a page having an index of an intermediate value among the plurality of pages PG may be selected as the reference pages REF_PG.

As another example, the reference pages REF_PG may be randomly selected from among a plurality of pages PG included in the memory block BLK.

Further, when the memory controller 120 reads data stored in the reference pages REF_PG included in the memory block BLK, the memory block BLK may be in a closed state.

Figure 11:
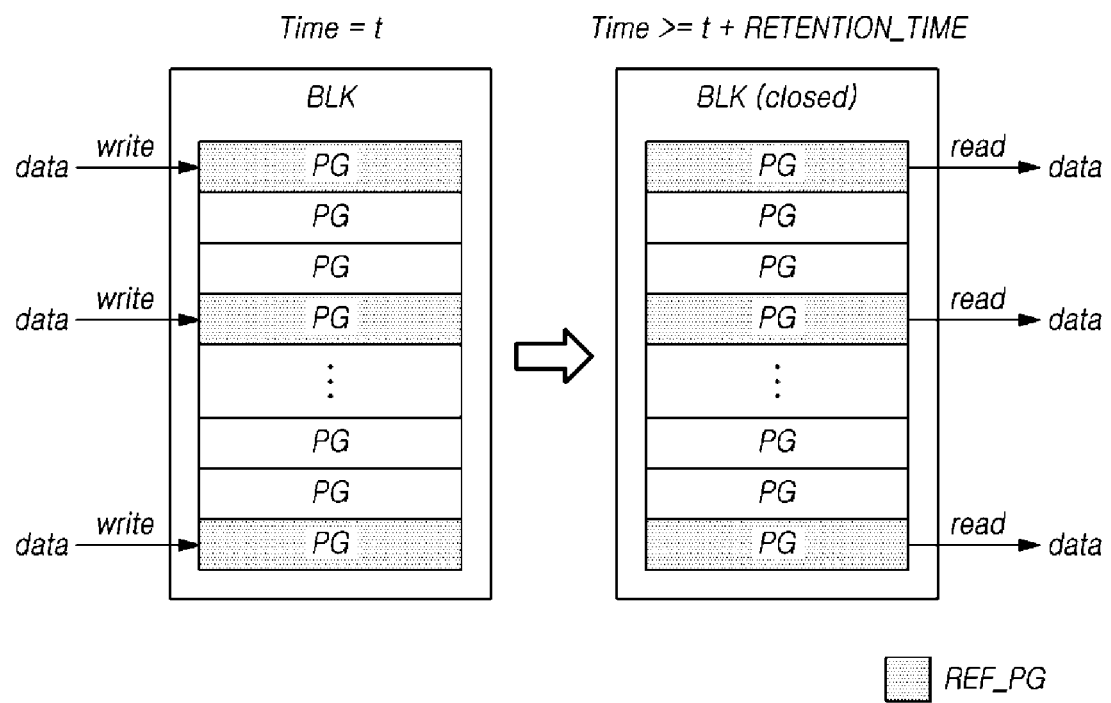
FIG. 11 illustrates an example of a time point when the memory system reads data stored in reference pages according to embodiments of the present disclosure.

FIG. 11 illustrates an example of a time point when the memory system 100 reads data stored in reference pages REF_PG according to embodiments of the present disclosure.

Referring to FIG. 11, the memory controller 120 of the memory system 100 may read data stored in the plurality of reference pages REF_PG, in consideration of the retention, after a preset reference time RETENTION_TIME or more has elapsed from a time point T when data is stored in the plurality of reference pages REF_PG.

The reason why the memory controller 120 reads data stored in the plurality of reference pages REF_PG after a preset reference time RETENTION_TIME or more has elapsed in consideration of retention is that there is a possibility that an error may occur due to retention after a specific time period or more has elapsed after data is stored.

Figure 12:
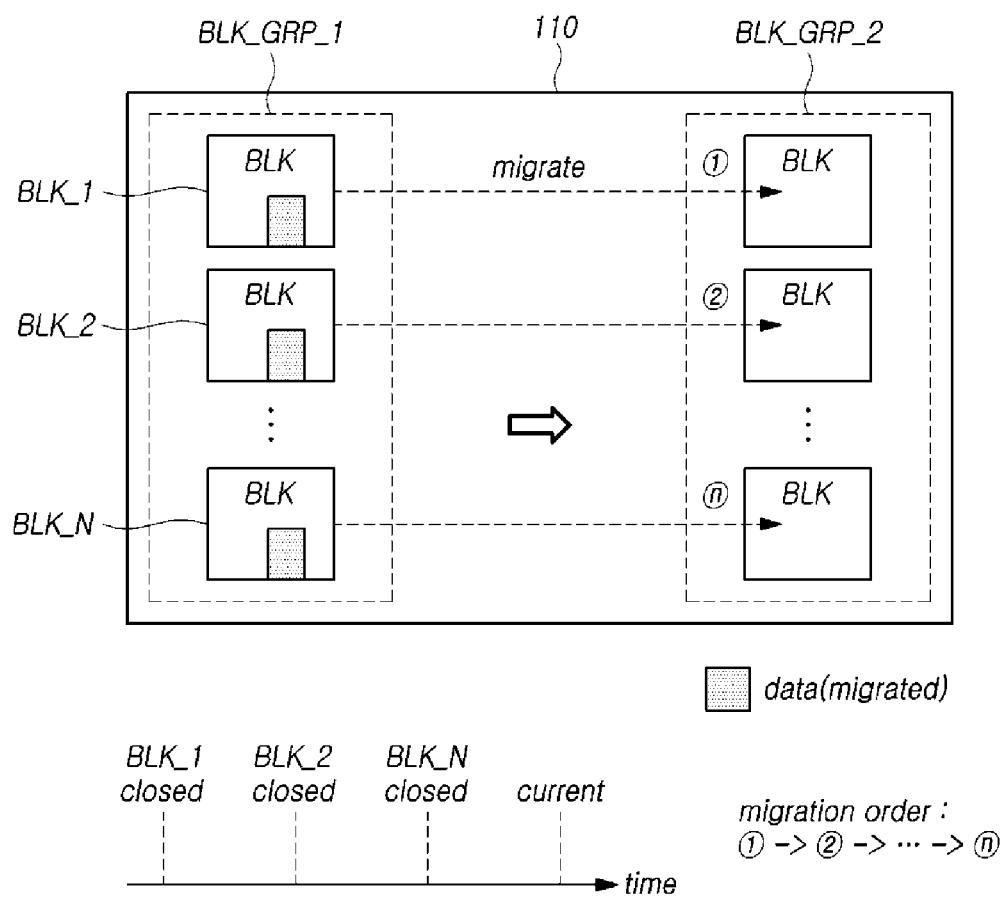
FIG. 12 illustrates another example of an order of migrating data stored in a first memory block group to a second memory block group by a memory system according to embodiments of the present disclosure.

FIG. 12 illustrates another example of an order of migrating data stored in a first memory block group BLK_GRP_1 to a second memory block group BLK_GRP_2 by a memory system 100 according to embodiments of the present disclosure.

Referring to FIG. 12, the memory controller 120 of the memory system 100 may determine an order of migrating the data stored in the first memory block group BLK_GRP_1 to the second memory block group BLK_GRP_2 based on a duration of a closed state of a memory block in the first memory block group BLK_GRP_1.

In FIG. 12, the duration of the closed state of the first memory block BLK_1 is the longest, and the duration of the closed state of the second memory block BLK_2 is the next longest. In addition, the duration of the closed state of the N-th memory block BLK_N is the shortest.

Accordingly, the memory controller 120 may first migrate the data stored in the first memory block BLK_1 to the second memory block group BLK_GRP_2 (①), and then migrate the data stored in the second memory block BLK_2 to the second memory block group BLK_GRP_2 (②). In this way, the memory controller 120 may migrate data stored in the N-th memory block BLK_N to the second memory block group BLK_GRP_2 (ⓝ).

Figure 13:
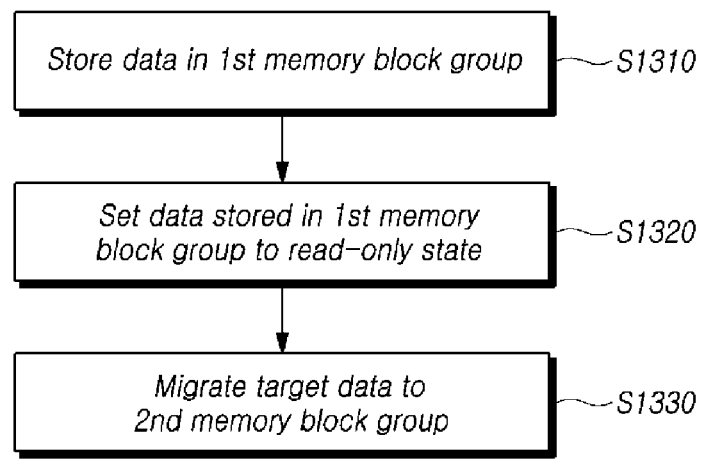
FIG. 13 illustrates an operating method of a memory system according to embodiments of the present disclosure.

FIG. 13 illustrates an operating method of a memory system 100 according to embodiments of the present disclosure.

Referring to FIG. 13, the operating method of a memory system 100 may include storing data in a first memory block group BLK_GRP_1 including N memory blocks among the plurality of memory blocks BLK, where N is a natural number equal to or greater than 2 (S1310).

The operating method of the memory system 100 may further include determining an order of storing data in the first memory block group BLK_GRP_1 based on the indexes of K super memory blocks SBLK_1, SBLK_2, . . . , SBLK_K included in the first memory block group BLK_GRP_1, where K is a natural number. In this case, each of the K super memory blocks SBLK_1, SBLK_2, . . . , and SBLK_K may include one or more of the memory blocks BLK included in the first memory block group BLK_GRP_1.

The operating method of the memory system 100 may include setting data stored in the first memory block group BLK_GRP_1 to a read-only state (S1320).

In addition, the operating method of a memory system 100 may include migrating, after a threshold time has elapsed from a reference time, target data which is all or part of the data stored in the first memory block group BLK_GRP_1, to a second memory block group BLK_GRP_2 including M memory blocks among the plurality of memory blocks BLK, where M is a natural number equal to or greater than 2 (S1330).

The operating method of the memory system 100 may further include setting the reference time to a time point when all or part of the data is written in one reference memory block REF_BLK among a plurality of memory blocks BLK included in the first memory block group BLK_GRP_1.

The operating method of the memory system 100 may further include determining, among the plurality of memory blocks BLK included in the first memory block group BLK_GRP_1, the reference memory block REF_BLK as (1) a memory block in which all or part of the data is written first, (2) a memory block with the largest read count, or (3) a memory block with the largest error bit rate.

For example, the operation S1330 of migrating the target data to the second memory block group BLK_GRP_2 may include determining an order of migrating the target data to the second memory block group BLK_GRP_1 according to an order of error bit rates for each of the memory blocks BLK_1, BLK_2, . . . , BLK_N included in the first memory block group BLK_GRP_1.

The operating method of the memory system 100 may further include calculating the error bit rate for each of the memory blocks BLK_1, BLK_2, . . . , BLK_N included in the first memory block group BLK_GRP_1 based on a result of reading data stored in one or more reference pages REF_PG included in each of the memory blocks BLK_1, BLK_2, . . . , BLK_N included in the first memory block group BLK_GRP_1, each memory block being in a closed state.

The operating method of the memory system 100 may further include reading the data stored in the one or more reference pages REF_PG after a retention time RETENTION_TIME has elapsed from a time point when data is stored in the one or more reference pages REF_PG.

The operating method of the memory system 100 may further include determining an order of migrating the target data to the second memory block group BLK_GRP_2 based on duration of a closed state of each of the memory blocks in the first memory block group BLK_GRP_1.

Figure 14:
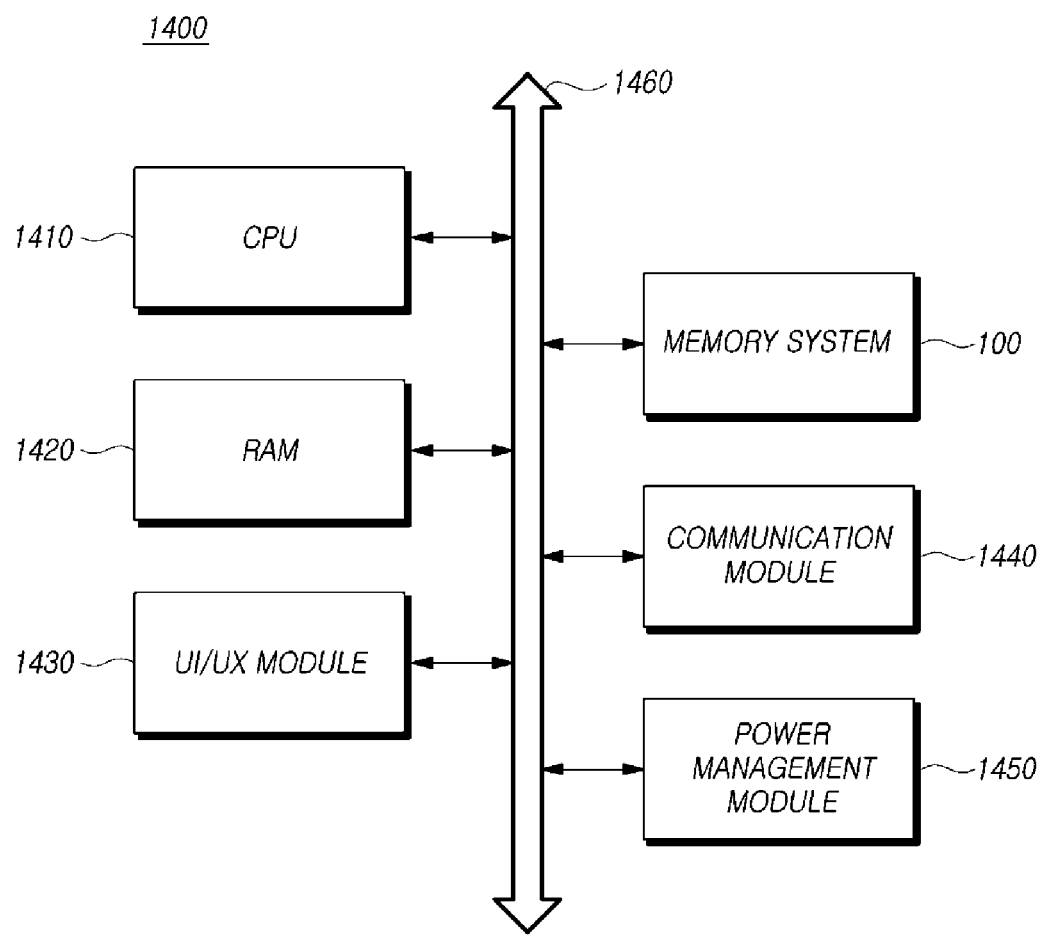
FIG. 14 illustrates the configuration of a computing system based on some embodiments of the disclosed technology.

FIG. 14 illustrates the configuration of a computing system 1400 based on some embodiments of the disclosed technology.

Referring to FIG. 14, the computing system 1400 based on an embodiment of the disclosed technology may include: a memory system 100 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory system comprising:
 a memory device including a plurality of memory blocks configured to store data; and
 a memory controller configured to:
 store data in a first memory block group including N memory blocks among the plurality of memory blocks, where N is a natural number equal to or greater than 2,
 set the data stored in the first memory block group to a read-only state, and
 migrate, after a threshold time has elapsed from a reference time, target data which is all or part of the read-only data stored in the first memory block group, to a second memory block group including M memory blocks among the plurality of memory blocks, where M is a natural number equal to or greater than 2.

2. The memory system of claim 1, wherein the memory controller is further configured to set the reference time to a time point when all or part of the data is written in one reference memory block among a plurality of memory blocks included in the first memory block group.

3. The memory system of claim 2, wherein the memory controller is further configured to determine the reference memory block as at least one of a memory block in which all or part of the data is written first, a memory block with the largest read count, or a memory block with the largest error bit rate, among the plurality of memory blocks included in the first memory block group.

4. The memory system of claim 1,
 wherein the memory controller is further configured to determine an order of storing data in the first memory block group based on indexes of K super memory blocks included in the first memory block group, where K is a natural number, and
 wherein each of the K super memory blocks includes one or more of the memory blocks included in the first memory block group.

5. The memory system of claim 1, wherein the memory controller is further configured to determine an order of migrating the target data to the second memory block group according to an order of an error bit rate for each of the memory blocks included in the first memory block group.

6. The memory system of claim 5, wherein the memory controller is further configured to calculate the error bit rate for each of the memory blocks included in the first memory block group based on a result of reading data stored in one or more reference pages included in each of the memory blocks included in the first memory block group, each of the memory block being in a closed state.

7. The memory system of claim 6, wherein the memory controller is further configured to read the data stored in the one or more reference pages after the reference time or more has elapsed from a time point when data is stored in the one or more reference pages.

8. The memory system of claim 1, wherein the memory controller is further configured to determine an order of migrating the target data to the second memory block group based on a duration of a closed state of each of the memory blocks in the first memory block group.

9. An operating method of a memory system, the operating method comprising:
   storing data in a first memory block group including N memory blocks among a plurality of memory blocks, where N is a natural number equal to or greater than 2;
   setting the data stored in the first memory block group to a read-only state; and
   migrating, after a threshold time has elapsed from a reference time, target data which is all or part of the read-only data stored in the first memory block group, to a second memory block group including M memory blocks among the plurality of memory blocks, where M is a natural number equal to or greater than 2.

10. The operating method of a memory system of claim 9, further comprising setting the reference time to a time point when all or part of the data is written in one reference memory block among a plurality of memory blocks included in the first memory block group.

11. The operating method of a memory system of claim 10, further comprising determining the reference memory block as at least one of a memory block in which all or part of the data is written first, a memory block with the largest read count, or a memory block with the largest error bit rate, among the plurality of memory blocks included in the first memory block group.

12. The operating method of a memory system of claim 9, further comprising determining an order of storing data in the first memory block group based on indexes of K super memory blocks included in the first memory block group, where K is a natural number,
   wherein each of the K super memory blocks includes one or more of the memory blocks included in the first memory block group.

13. The operating method of a memory system of claim 9, further comprising determining an order of migrating the target data to the second memory block group according to an order of an error bit rate for each of the memory blocks included in the first memory block group.

14. The operating method of a memory system of claim 13, further comprising calculating the error bit rate for each of the memory blocks included in the first memory block group based on a result of reading data stored in one or more reference pages included in each of the memory blocks included in the first memory block group, each of the memory block being in a closed state.

15. The operating method of a memory system of claim 14, further comprising reading the data stored in the one or more reference pages after the reference time or more has elapsed from a time point when data is stored in the one or more reference pages.

16. The operating method of a memory system of claim 9, further comprising determining an order of migrating the target data to the second memory block group based on a duration of a closed state of each of the memory blocks in the first memory block group.

17. An operating method of a controller, the operating method comprising:
   preventing data from being updated, the data being stored in a group of first memory blocks within a memory device; and
   controlling the memory device to move, according to an order, the data to a group of second memory blocks within the memory device a predetermined time after at least a piece of the data is stored in a selected one of the first memory blocks,
   wherein the order is determined based on one of error bit rates of pieces of the data that are read from the respective first memory blocks and time amounts that the respective first memory blocks stay closed, and
   wherein the selected first memory block is one of a memory block that first stores at least a piece of the data, a memory block having a greatest read count and a memory block having a greatest error bit rate.

* * * * *